United States Patent [19]

Cavender

[11] Patent Number: 4,717,518

[45] Date of Patent: * Jan. 5, 1988

[54] NOVEL PROCESS FOR MAKING POLYURETHANE PRODUCTS WHICH REQUIRE REDUCED CRUSHING IN PREVENTING SAID PRODUCTS FROM SUBSTANTIALLY SHRINKING OR CHANGING DIMENSIONALLY UPON COOLING

[75] Inventor: Keith D. Cavender, Charleston, W. Va.

[73] Assignee: Union Carbide Corporation, Danbury, Conn.

[*] Notice: The portion of the term of this patent subsequent to Apr. 1, 2003 has been disclaimed.

[21] Appl. No.: 778,307

[22] Filed: Sep. 20, 1985

[51] Int. Cl.[4] .................. B29C 67/22; B29C 39/10; B29C 9/38

[52] U.S. Cl. .................................. 264/51; 249/170; 264/53; 264/54; 264/101; 264/DIG. 5; 264/DIG. 13; 264/DIG. 15; 425/817 R

[58] Field of Search ............ 264/53, 54, 46.4, DIG. 5, 264/DIG. 13, 101, 51, DIG. 15; 249/170; 425/817 R

[56] References Cited

U.S. PATENT DOCUMENTS 4,579,700  4/1986  Cavender .................. 264/53 X

FOREIGN PATENT DOCUMENTS

1402718  8/1975  United Kingdom .

Primary Examiner—Philip Anderson
Attorney, Agent, or Firm—P. W. Leuzzi

[57] ABSTRACT

A process for making molded high resilience polyurethane cellular products which require reduced crushing in preventing the products from substantially shrinking or changing dimensionally upon cooling which comprises: exposing the curing product to atmospheric pressure while in contact with the confines of the mold at a time when the cell walls of the curing polyurethane cellular product have cured sufficiently to develop sufficient strength to partially resist bursting by the pressure of said expansion gases contained within the cell walls upon exposure to atmospheric pressure, but before the cell walls have cured sufficiently to develop sufficient strength so that exposure to atmospheric pressure does not result in a reduction of the crushing force necessary to prevent the products from substantially shrinking or changing dimensionally.

9 Claims, 1 Drawing Figure

NOVEL PROCESS FOR MAKING POLYURETHANE PRODUCTS WHICH REQUIRE REDUCED CRUSHING IN PREVENTING SAID PRODUCTS FROM SUBSTANTIALLY SHRINKING OR CHANGING DIMENSIONALLY UPON COOLING

BACKGROUND OF THE INVENTION

1. Field Of The Invention

This invention relates to the molding of cellular plastic products such as polyurethane foam products and more specifically is directed to a novel and useful process technique applicable to such molded high resilience polyurethane foam which allows the production of more readily crushable foam.

2. Prior Art

In the normal manufacture of molded high resilience polyurethane foam, the chemical reactants required to make the foam part are intimately mixed by mechanical means in accurately metered quantities per a designed stoichiometry and immediately poured into a mold. The mold is then closed and the reactant charge is allowed to expand to fill the intricacies of the mold by displacement of air which is allowed to exit the mold through special vents or, in some cases, a less than air tight mold parting line. The expansion results from gas generation either as a product of reaction of formulation water with the isocyanate to yield $CO_2$ and/or by volatilization of an auxiliary blowing agent such as a fluorocarbon. Concurrently with this expansion or blowing mechanism, urethane polymers are being formed by the reaction of the polyols and the isocyanate. Normal state of the art technology allows for catalytically balancing these concurrent reactions so as to achieve maximum expansion more or less coincident with gelation or loss of mobility of the plastic mass. The polyurethane then continues to cure until such polymer strength is achieved as to allow manual demolding of a useful foamed part having the shape and dimensions of the mold.

In formal state of the art practice, as the expanding mass in the mold reaches the air vents, some small amount of material will extrude through; however, the on-going polymerization reaction quickly advances to the stage where further fluid flow is effectively precluded. At this state the mold becomes effectively sealed. Further expansion is thereby eliminated although the blowing mechanism may continue to be operative causing a pressure build in the cells which make up the cellular product.

After allowing adequate in-mold curing time, the part that is produced after this molding procedure is considered to be "closed" cell, meaning that a sufficient number of the cells making up the foamed part are closed to the degree that, if the part is allowed to cool to ambient temperature, the part will shrink as internal cell pressures drop below atmospheric. To avoid this post mold shrinkage, the normal procedure is to crush the just demolded and still warm part through some sort of crushing operation. This crushing step serves to burst open the cell windows of the cells allowing the air in the cells to equilibrate to outside pressure and thus avoid shrinking. Typical techniques for crushing include passing the part through rolls that cause one or more deflections of the part of the order of 90% of original thickness. Other techniques sometimes employed involve crushing the foam with a rubber tire as it comes over a belt, vacuum crushing, and air injection. Each of these techniques is currently employed in the industry and have specific utility in bursting cell walls/windows adequately to eliminate shrinkage if the foam is not too "tight", i.e., hard to crush. Foam which is too tight may split in the crusher or may not crush out adequately to preclude shrinkage.

Tight foam can result from several causes both chemical and physical and in many cases those elements of the formulation that cause tight foam are desirable for other reasons, and generally a workable or crushable tightness dictates a compromise in other areas. For example, tight foams are more stable and less likely to exhibit shear induced collapse.

All the methods of foam crushing described above function by means of creation of a pressure differential across cell windows adequate to cause window rupture thereby leaving an open cell. An earlier application, U.S. Ser. No. 549,516 filed Nov. 7, 1983, now U.S. Pat. No. 4,579,700 issued Apr. 1, 1986 describes a unique processing technique wherein a cell rupturing pressure differential is created by means of exposing the molded part to atmospheric pressure. This is done at such a time in the cure cycle that insufficient polymer strength exists in the expanded urethane to contain the internal cell pressures which are greater than atmospheric. The polymer strength is sufficient at this point, however, to prevent the atmospheric pressure from collapsing the foam cells.

This technique, termed "TPR" for Timed Pressure Release, is accomplished while the molded part is still within the mold by the simple expedient of unsealing the mold at the critical time by either unlatching the lid or by opening a special port. When properly practiced, this technique can yield a molded high resilience polyurethane foam part that does not require post mold crushing and will not shrink upon cooling.

Because the mold must be unsealed at a precise point when the foam will not collapse, i.e., because of sufficient polymer strength at this point to withstand collapse, yet there is a sufficient pressure differential across the cell windows to rupture these windows, the timing of this pressure release is critical. If pressure release occurs too early, then foam collapse will occur; if too late, then sufficient polymeric strength will have developed so that the cell windows can withstand the pressure differential resulting in no window rupture and a foam that shrinks or requires crushing after demold.

Studies have shown that essentially all high resilience polyurethane molded formulations have a processing time "window" wherein this technique can effectively eliminate crushing. The TPR window can vary in duration of time as a function of formulation variables that effect system reactivity. Rapid demold systems (where demolding occurs less than $3\frac{1}{2}$ minutes after the reactants are mixed), such as those used in the production of high resilience polyurethane foams, usually have TPR windows so short in duration (as short as 5 seconds has been observed) that application of the TPR technique has limited utility in a production environment.

Thus, it would be very advantageous and a technical advancement over the prior art to expose a curing product to atmospheric or reduced pressure at a point in time somewhere past the TPR window where it is not necessary to worry about the short duration of time of said window, but before the cell walls have developed sufficient strength where exposure to atmospheric pressure would not result in a reduction of the crushing force necessary to prevent said products from substantially shrinking or changing dimensionally.

As mentioned above, a window of short time duration, such as those characteristic in rapid demold systems, is of limited utility in a production environment. This is because foam making is not an exact science; small variations in the exact second of delivery of reactants by the machines and in the exact isocyanate levels used in the foam productions create variations in exactly when the balance between the polymer strength to withstand collapse and total rupture of nearly all cell windows occurs. These variations can be as great as 10–20 seconds. Because the TPR window is of such short duration in rapid demold systems, there is no guarantee that the mold will be unsealed at the precise moment required. With the technique of the present invention, it is not critical that the mold be unsealed at that precise point because it is not necessary that all the cell windows be opened; the present invention is aimed at reducing the force to crush, not at eliminating the crushing step altogether.

Other than the patent application discussed above, no prior art is currently known which utilizes the concept of pressure release by venting to a lower pressure environment during a critical period of polymer formation such that the higher pressure in the cells is sufficient to rupture the cell window yet not strong enough to collapse the growing polymer.

There is one patent, British Pat. No. 1,402,718, which discloses reopening vent holes during the production of foam in a cushion so that excess gas may escape and make the resulting cushion softer. This patent, however, uses very few vents which are additionally quite small in diameter. Moreover, the vents are unplugged one by one resulting in a very small quantity of cells ever being exposed to atmospheric pressure at one time. Thus, the number of cells opened is not appreciable and, in particular, is not greater than 25%.

As noted above, no method is known for using the differences between atmospheric pressure and the higher cell pressures to open cell windows prior to demold, and thereby reducing the force to crush in a post mold crushing step.

3. Objectives

It is thus an object of this invention to teach the use of a process using atmospheric pressure differential at a point past the TPR window, i.e., as is necessary in a rapid demold system with TPR windows of short duration, but before the cell walls have developed sufficient strength so that exposure to the lower atmospheric pressure does not result in a reduction of the crushing force necessary to prevent polyurethane cellular products from substantially shrinking or changing dimensionally.

It is a further object of this invention to provide molded high resilience foams that require less force to crush to preclude substantial shrinking or dimensional change.

It is still a further object of this invention to provide a mechanism to make crushing possible with very "tight" mold foams as are characteristic of highly reactive and/or rapid demold systems.

It is an even further object of this invention to permit greater formulation latitudes by decreasing the constraints normally imposed by foam tightness considerations.

Another object of this invention is to teach the use of a vacuum in this process to increase the pressure differential and thus broaden the latitude of the technique of reducing the force to crush.

Other objects and advantages of the invention will become apparent as the description thereof proceeds.

BRIEF SUMMARY OF THE INVENTION

In satisfaction of the foregoing objects, this invention provides a unique technique for making a molded high resilience polyurethane foam that is more readily crushed by conventional crushing means than would be possible without practice of the invention. Specifically this invention utilizes an in-mold pressure release at a time past the TPR window as previously described, to make a low-crush non-shrinking foam. Because pressure release occurs past this TPR window and the nearly complete cell window opening associated with the precise moment of TPR has thereby not occurred, some crushing is still essential to preclude part shrinkage; however, it has been found that the force required to crush the foam can be significantly reduced.

It is apparent that pressure releases in this later time frame in the in-mold cure cycle result in opening of a percentage of the polyurethane cells by the mechanism of creating a pressure differential across cell windows which a certain percentage of the cells cannot contain because of the limited degree of polyurethane polymerization cure at that point in time. Because of this differential, the higher internal pressures of the cells can burst open the cell windows while equilibrating with the lower atmospheric pressure. It will further become clearer through this application and the examples that the quantity of all windows burst so that the cells become open varies inversely with the time of pressure release. That is, the more time waited to expose the mold to atmospheric pressure past the TPR window, the more the crushing that will be needed in the post crushing step, i.e., fewer cell windows will be burst open and the cells will be "tighter". Because the number of open cells is somewhere between nearly all being open (exposure at TPR window) and nearly all being closed (exposure at demold), it is possible to control the experimental parameters so that the desired amount of tightness is built into the foam. In addition, the use of a vacuum can further increase pressure differentials broadening the latitude of the invention.

DETAILED DESCRIPTION OF THE DRAWING

Figure 1:
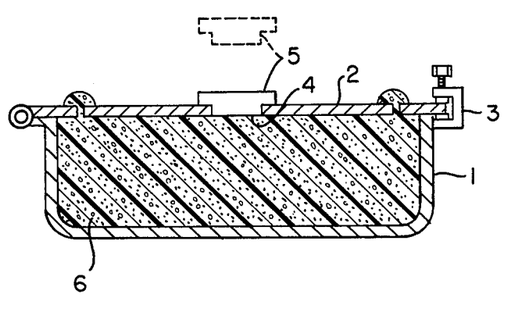
FIG. 1 illustrates the cross-section of a mold useful in practicing the present invention.

FIG. 1 illustrates the cross-section of mold (1) having a closeable lid (2) and a latching mechanism (3). The mold also has a closeable port (4) and a closure for the port (5).

The step of exposing the curing product (6) to atmospheric pressure while in contact with the confines of the mold (1) can be easily accomplished by simply unlatching the mold latch (3) at the appropriate time. Alternatively, the exposure to atmospheric pressure can be achieved by providing the mold (1) with one or more closeable ports (4) which can be opened at the appropriate time. For example, the port (4) or ports can simply be one or more holes cut through the wall of the mold and provided with closures (5) for the holes so that the initial rising of the foam and molding of the foam occurs while the port (4) is closed. The port (4) can be easily opened by opening the closure (5) at the appropriate time.

DETAILED DESCRIPTION OF THE INVENTION

The present invention is concerned primarily, but not exclusively, with rapid demold systems, i.e., those in which demolding occurs less than 3½ minutes after the reaction ingredients have been mixed, in which the production environment makes it extremely difficult to assure the mold will be opened to atmospheric pressure within the time pressure release window. This is because the time duration of the TPR window is so short, while, because of variations in reaction conditions, the time at which the mold is ready for exposure (e.g. 10–30 seconds) can vary more greatly than the duration of said window (e.g. 5 seconds). For example, if the mold is unsealed at the same time every run, on one run the mold reactants may be at the equilibrium point necessary to eliminate post mold crushing and, on the next run, the mold reactants may not be quite at this equilibrium point. Thus, in a rapid demold system, there is no guarantee that the mold can be unsealed at precisely the point where crushing is totally eliminated, i.e., the pressure equilibrium point where the polymer strength is sufficient to withstand crushing yet there is sufficient pressure differential to rupture nearly all the cell windows. Consequently, the invention is involved with exposing the cell walls of a curing product to atmospheric pressure at some point past the TPR window, but before said cell walls have cured sufficiently to develop sufficient strength so that exposure to atmospheric pressure does not result in a reduction of the crushing force necessary to prevent curing polyurethane cellular products from substantially shrinking or changing dimensionally. Releasing the mold to atmospheric pressure past the TPR window, as contemplated by the present invention, results in a reduction of the force necessary to crush the foam after it is demolded rather than an elimination of the crushing step altogether. This is because the polymer strength continues to increase as the critical time pressure release window is passed so that the cell windows become increasingly more difficult to rupture. Consequently, the greater the amount of time waited past the TPR window, the smaller will be the decrease in the force to crush in the post mold crushing step. For example, exposure of the mold to atmospheric pressure at demold time results in almost no reduction in the force to crush at all.

The process of this invention comprises the steps of:

1. introducing a liquid foamable polyurethane reaction mixture into a mold adapted to expose the curing mixture to atmospheric pressure during the curing of said product and said mold adapted to be closed;

2. closing said mold;

3. permitting said reaction mixture to expand into contact with the confines of the mold to form a curing molded polyurethane cellular product containing cells having cell walls of curing polyurethane and pressurized expansion gases contained within and supporting said cell walls;

4. exposing said curing product to atmospheric pressure while in contact with the confines of the mold at a time when said cell walls of said curing polyurethane cellular product have cured sufficiently to develop sufficient strength to partially resist bursting by the pressure of said expansion gases contained within said cell walls upon exposure to atmospheric pressure, but before said cell walls have cured sufficiently to develop sufficient strength so that exposure to atmospheric pressure does not result in a reduction of the crushing force necessary to prevent said products from substantially shrinking or changing dimensionally;

5. allowing said curing polyurethane product to continue to cool and cure in said mold until it has developed sufficient strength to be removed from the mold without permanently distorting its shape;

6. removing said product from said mold; and 7. crushing said product to prevent shrinkage or dimensional change.

The step of exposing the curing product to atmospheric pressure while in contact with the confines of the mold can be easily accomplished by simply unlatching the mold latch at the appropriate time past the TPR window. Alternatively, the exposure to atmospheric pressure can be achieved by providing the mold with one or more closable ports which can be opened at the appropriate time past the TPR window. For example, the port or ports can simply be one or more holes cut through the wall of the mold and provided with closures for the holes so that the initial rising of the foam and molding of the foam occurs while the port is closed. The port can be easily opened by opening the closure at the appropriate time.

The invention is especially suited to the manufacture of polyurethane cellular products having softened crush requirements such as in situ or pour-in-place molded polyurethane seating wherein the foam making reactants are poured directly into a preformed fabric or vinyl trim cover contained within a mold thus contributing to fewer torn or damaged parts.

Additionally, this invention is well suited to provide a mechanism to make crushing possible with very "tight" molded foams as are characteristic of highly reactive and/or rapid demold systems.

The process of this invention grants greater formulation latitude in selecting the reactants by decreasing the constraints normally associated with tight foam, e.g., rapid demold foam. For example, pads made from molds which are not exposed to atmospheric pressure, except at demold, show great reductions in the force necessary to crush them when the molds are exposed according to the invention. The percentage of reduction decreases as the pressure release time to which they were exposed approaches demold time. When exposed to pressure at demold time, no force reduction was observed. Exposure to atmospheric pressure under this process also decreases the number of passes through a crusher needed to soften the foam.

In addition, the present invention process allows greater formulation latitude of reactants with respect to the quantity of silicone which can be used.

In another embodiment of the present invention process, the mold may be subjected to a momentary vacuum immediately after being subjected to atmospheric pressure. This additional vacuum serves to further increase the pressure differential between the cell windows and the external pressure resulting in more open windows and greater reductions in the force needed to crush the foam in the post mold crushing step.

As an illustration of the invention, the foamable reaction mixture is conveniently prepared by mixing a preblend of all ingredients except the polyisocyanate and fluorocarbon blowing agent and thereafter mixing the preblend with the fluorocarbon blowing agent and the polyisocyanate and quickly introducing the resulting mixture into the mold. The preblend contains ingredients, such as, the polyol which may comprise a polymer/polyol or a mixture of polyol and polymer/polyol; water; catalyst or catalysts; surfactant or surfactants, in addition to any other additives such as pigments or special effects additives. These ingredients, when used in the preblend, should be chosen so that they do not inter-react with each other so as to allow the preblend to be formed well in advance of mixing the polyisocyanate and fluorocarbon blowing agent. However, once the polyol and/or water are contacted with the polyisocyanate the polyurethane-forming or $CO_2$ forming reaction begins. The fluorocarbon is volatile and it would not be especially useful to add the fluorocarbon to the preblend unless the preblend is to be used right away.

Substantially any polyol used in the art to make polyurethane can be used in making the foamable reaction mixtures used in this invention. Illustrative polyols useful in producing foamable compositions used in this invention are the polyhydroxyalkanes, the polyoxyalklene polyols, or the like. Among the polyols which can be employed are those selected from one or more of the following classes of composition, alone or in admixture, known to those skilled in the polyurethane art:

(a) Alkylene oxide adducts of polyhydroxyalkanes;
(b) Alkylene oxide adducts of non-reducing sugars and sugar derivatives;
(c) Alkylene oxide adducts of phosphorus and polyphosphorus acids:
(d) Alkylene oxide adducts of polyphenols;
(e) The polyols from natural oils such as castor oil, and the like.

Illustrative alkylene oxide adducts of polyhydroxyalkanes include, among others, the alkylene oxide adducts of ethylene glycol, propylene glycol, 1,3-dihydroxypropane, 1,3-dihydroxybutane, 1,4-dihydroxybutane, 1,4-, 1,5- and 1,6-dihydroxyhexane, 1,2-, 1,3-, 1,4-, 1,6- and 1,8-dihydroxyoctane, 1,10-dihydroxydecane, glycerol, 1,2,4-trihydroxybutane, 1,2,6-trihydroxyhexane, 1,1,1-trimethylolethane, 1,1,1-trimethylolpropane, pentaerythritol, caprolactone, polycaprolactone, xylitol, arabitol, sorbitol, mannitol, and the like. A preferred class of alkylene oxide adducts of polyhydroxyalkanes are the propylene oxide adducts and the propylene oxide-ethylene oxide adducts of di- and/or trihydroxyalkanes.

The alkylene oxide adducts of phosphorus and polyphosphorus acids are another useful class of polyols. Ethylene oxide, 1,2-epoxypropane, the epoxybutanes, 3-chloro-1,2-epoxypropane, and the like are preferred alkylene oxides. Phosphoric acid, phosphorus acid, the polyphosphoric acids such as tripolyphosphoric acid, the polymetaphosphoric acids, and the like are desirable for use in this connection.

A further class of polyols which can be employed are the alkylene oxide adducts of the non-reducing sugars, wherein the alkylene oxides have from 2 to 4 carbon atoms. Among the non-reducing sugars and sugar derivatives contemplated are sucrose, alkyl glycosides such as methyl glucoside, ethyl glucoside, and the like, glycol glycosides such as ethylene glycol glucoside, propylene glycol glucoside, glycerol glucoside, 1,2,6-hexanetriol glucoside, and the like, as well as the alkylene oxide adducts of the alkyl glycosides as set forth in U.S. Pat. No. 3,073,788.

A still further useful class of polyols is the polyphenols, and preferably the alkylene oxide adducts thereof wherein the alkylene oxides have from 2 to 4 carbon atoms. Among the polyphenols which are contemplated are found, for example, bisphenol A, bisphenol F, condensation products of phenol and formaldehyde, the novolac resins; condensation products of various phenolic compounds and acrolein; the simplest member of this class being the 1,1,3-tris(hydroxyphenyl) propanes, condensation products of various phenolic compounds and glyoxal, glutaraldehyde, and other dialdehydes, the simplest members of this class being the 1,1,2,2-tetrakis(hydroxyphenol) ethanes, and the like.

The alkylene oxide adducts of phosphorus and polyphosphorus acids are another useful class of polyols. Ethylene oxide, 1,2-epoxypropane, the epoxybutanes, 3-chloro-1,2-epoxypropane, and the like are preferred alkylene oxides. Phosphoric acid, phosphorus acid, the polyphosphoric acids such as tripolyphosphoric acid, the polymetaphosphoric acids, and the like are desirable for use in this connection.

The polyols employed can have hydroxyl members which vary over a wide range and are suitable to provide flexible or semi-flexible polyurethane foams from reaction with polyisocyanate. In general, the hydroxyl members of the polyols employed in the invention can range from about 20, and lower, to about 150, and higher. The hydroxyl number is defined as the number of milligrams of potassium hydroxide required for the complete hydrolysis of the fully acetylated or phthalated derivative prepared from 1 gram of polyol. The hydroxyl number can also be defined by the equation:

$$OH = \frac{56.1 \times 1000 \times f}{m.w.}$$

where
OH = hydroxyl number of the polyol
f = functionality, that is, average number of hydroxyl groups per molecule of polyol
m.w. = molecular weight of the polyol The exact polyol employed depends upon the end-use of the polyurethane product to be produced. The molecular weight of the hydroxyl number is selected properly to result in flexible or semi-flexible foams when the polyol is converted to a polyurethane. The polyols preferably possess a hydroxyl number of from about 50 to about 150 for semi-flexible foams and from about 30 to about 70 for flexible foams but can be as low as 20. Such limits are not intended to be restrictive, but are merely illustrative of the large number of possible combinations of the above polyol coreactants.

The most preferred polyols employed in this invention include the poly(oxypropylene) glycols, triols and higher functionality polyols. These polyols also include poly(oxypropylene-oxyethylene) polyols; however, desirably, the oxyethylene content should comprise less than 80 percent of the total and preferably less than 60 percent. The ethylene oxide when used can be incorporated in any fashion along the polymer chain. Stated another way, the ethylene oxide can be incorporated either in internal blocks, as terminal blocks, or may be randomly distributed along the polymer chain. Most preferably, the ethylene oxide when used is incorporated as terminal blocks, i.e., capping units. Polymer/polyols can be used and are preferred as a part or all of the polyol requirements of the foamable formulation used in this invention and are also well known, the basic patents being the Stamberger patents, U.S. Pat. Nos. 3,304,273; 3,383,351, Re. 28,715 (reissue of 3,383,351) and 3,523,093. Later disclosures of polymer/polyols include the Scharf et al. and Kuryla Canadian Pat. Nos. 735,010 and 785,835; the Pizzini et al. U.S. Pat. No. 3,823,201; the Ramlow et al. U.S. patent application, Ser. No. 431,080, filed Jan. 7, 1974, now U.S. Pat. No. 4,436,849; the Ramlow et al. patent U.S. Pat. No. 3,953,393; the DeWald U.S. Pat. No. 3,655,553; and the Shah patent U.S. Pat. No. 4,119,586. These as well as any other suitable polymer/polyol can be employed herein. The polymer of the polymer/polyol is formed by polymerizing one or more polymerizable ethylenically unsaturated monomers. The proportion of polymer in the polymer/polyol can range from about 4 to about 50 weight percent, preferably from about 15 to about 35 weight percent, based on the total weight of the polymer/polyol. The polymer is preferably formed in situ the polyol which can be any of the polyols described above. The polymerizable ethylenically unsaturated monomers which can be used making the polymer/polyols employed in this invention include the polymerizable ethylenically unsaturated hydrocarbon monomers and polymerizable ethylenically unsaturated organic monomers the molecules of which are composed of carbon, hydrogen and at least one of O, S, or N. These monomers are characterized by the presence therein of at least one polymerizable ethylenic unsaturated group of the type

C=C

The monomers can be used singly or in combination to produce homopolymer/polyol or copolymer/polyol reactive compositions. These monomers are well known in the art and include the hydrocarbon monomers such as styrene, alpha-methylstyrene, methylstyrene, 2,4-dimethylstyrene, ethylstyrene, isopropylstyrene, butylstyrene, phenylstyrene, cyclohexylstyrene, benzylstyrene, and the like; the acrylic and substituted acrylic monomers such as acrylic acid, methacrylic acid, methyl acrylate, 2-hydroxyethyl acrylate, 2-hydroxyethyl methacrylate, methyl methacrylate, octyl methacrylate, acrylonitrile, methacrylonitrile, 2-ethylhexyl acrylate, phenyl acrylate, phenyl methacrylate, N,N-dimethylacrylamide, and the like; the vinyl esters, vinyl ketones, etc., such as, vinyl acetate, vinyl alcohol, vinyl butyrate, vinyl acrylate, vinyl methacrylate, N-vinyl-pyrrolidone, and the like; the vinyl halides and vinylidene halides, such as, vinyl chloride, vinyl fluoride and vinylidene chloride and the like; t-butylaminoethyl methacrylate, glycidyl acrylate, allyl alcohol, vinyl pyridine, and the like. Any of the known polymerizable monomers can be used and the compounds listed above are illustrative and not restrictive of the monomers suitable for use in this invention. Any of the known chain transfer agents can be present if desired. The preferred monomer used to make the polymer of the polymer/polyol used in this invention is acrylonitrile alone as a homopolymer or in combination with styrene or methyl methacrylate as a copolymer. The relative weight proportions of acrylonitrile to styrene illustratively range from about 20:80 to about 100:0., preferably from about 25:75 to 100:0 and more preferably, when low molecular weight polyols, e.g., below about 2000 are used, then the weight ratio should be from about 60:40 to about 85:15.

The catalysts that are useful in producing molded cellular flexible polyurethane in accordance with this invention include: (a) tertiary amines such as bis(dimethylaminoethyl) ether, trimethylamine, triethylamine, N-methylmorpholine, N-ethylmorpholine, N,N-dimethylbenzylamine, N,N-dimethylethanolamine, N,N,N',N'-tetramethyl-1,3-butanediamine, triethylenediamine, triethlanolamine, 1,4-diazabicyclo[2.2.2]octane, pyridine oxide and the like; (b) tertiary phosphines such as trialkylphosphines, dialkylbenzylphosphines, and the like; (c) strong bases such as alkali and alkaline earth metal hydroxides, alkoxides, and phenoxides; (d) acidic metal salts of strong acids such as ferric chloride, stannic chloride, stannous chloride, antimony trichloride, bismuth nitrate and chloride, and the like; (e) chelates of various metals such as those which can be obtained from acetylacetone, benzoylacetone, trifluoroacetylacetone, ethyl acetoacetate, salicyladehyde, cyclopentanone-2-carboxylate, acetylacetoneimine, bisacetylacetone-alklenediimines, salicyladehydeimine, and the like, with the various metals such as Be, Mg, Zn, Cd, Pb, Ti, Zr, Sn, As, Bi, Cr, Mo, Mn, Fe, Co, Ni, or such ions as $MoO_2^{++}$, $UO_2^{++}$, and the like (f) alcoholates and phenolates of various metals such as Ti(OR)$_4$, Sn(OR)$_4$, Sn(OR)$_2$, Al(OR)$_3$, and the like, wherein R is alkyl or aryl and the reaction products of alcoholates with carboxylic acids, beta-diketones, and 2-(N-N-dialkylamino) alkanols, such as the well known chelates of titanium obtained by said or equivalent procedures; (g) salts of organic acids with a variety of metals such as alkali metals, alkaline earth metals, Al, Sn, Pb, Mn, Co, Ni, and Cu, including, for example, sodium acetate, potassium laurate, calcium hexanoate, stannous acetate, stannous octoate, stannous oleate, lead octoate, metallic driers such as manganese and lead naphthenate, and the like; (h) organometallic derivatives of tetravalent tin, trivalent and pentavalent, As, Sb, and Bi, and metal carbonyls of iron and cobalt.

Among the organotin compounds that deserve particular mention are dialkyltin salts of carboxylic acids, e.g., dibutyltin diacetate, dibutyltin dilaurate, dibutyltin maleate, dilauryltin diacetate, dioctyltin diacetate, dibutyltin-bis(4-methylaminobenzoate), dibutyltin-bis(6-methylaminocaproate), and the like. Similarly, there may be used a trialkyltin hydroxide, dialkytin oxide, dialkyltin dialkoxide, or dialkyltin dichloride. Examples of these compounds include trimethyltin hydroxide, tributyltin hydroxide, trioctyltin hydroxide, dibutyltin oxide, dioctyltin oxide, dilauryltin oxide, dibutyltin-bis(isopropoxide), dibutyltin-bis(2-dimethylaminopentylate), dibutyltin dichloride, dioctyltin dichloride, and the like.

The tertiary amines may be used as primary catalysts for accelerating the reactive hydrogen/isocyanate reaction or as secondary catalysts in combination with one or more of the above-noted metal catalysts. Metal catalysts, or combinations of metal catalysts, may also be employed as the accelerating agents, without the use of amines. The catalysts are employed in small amounts, for example from about 0.001 percent to about 5 percent of each, based on weight of the reaction mixture.

It is also within the scope of the invention to employ small amounts, e.g., about 0.01 percents to 5.0 percent by weight, based on the total reaction mixture, or a silicone foam stabilizer. Useful silicone surfactants included blends of one or more polyols as defined hereinabove with a silicone such as an aryl modified dimethyl silicone oil or a polyphenylethylsiloxane copolymer.

Other useful silicone surfactants are the "hydrolyzable" polysiloxane-polyoxyalkylene block copolymers such as the block copolymers described in U.S. Pat. Nos. 2,834,748 and 2,917,480. Another useful class of foam stabilizers are the "nonhydrolyzable polysiloxane-polyoxyalkylene" block copolymers such as the block copolymers described in U.S. Pat. No. 3,505,377; U.S. patent application No. 888,067, filed Dec. 24, 1969 now U.S. Pat. No. 4,197,602, and British Patent Specification No. 1,220,471. The latter class of copolymers differs from the above-mentioned polysiloxane-poloxyalkylene block copolymers in that the polysiloxane moiety is bonded to polyoxyalkylene moiety through carbon-to-oxygen-to-silicon bonds. These various polysiloxanes-polyoxyalkylene block copolymers preferably contain from 5 to 50 weight percent of polysiloxane polymer with the remainder being polyoxyalkylene polymer. Any other suitable surfactants or stabilizers can be used.

Any compatible pigment can be used in the foamable mixture used in this invention. Carbon black is extensively used as a pigment in polyurethane products. Other useful pigments include Prussian blue, manganese violet, manganese blue, emerald green, cobalt blue, cobalt violet, Mayan blue, iron oxide red, chrome red, vermillion, ultramarine blue, ultramarine violet, phthalocyanine green and brilliant red. The amounts of pigments used are not narrowly critical and depend in large part on the shade of medium to dark color desired. Illustrative ranges are from about 0.1 to about 4 weight percent, preferably about 0.3 to about 2 weight percent of the pigment based on the weight of the polyurethane product. Larger amounts of pigment can be used although difficulties with mixing and handling the larger amounts of pigments can result because of increased viscosity. The pigment can be incorporated into the polyol, the polyisocyanate composition, or both but preferably is added to the preblend.

A small amount of a polyurethane blowing agent, such as, water is used, in the foamable reaction mixture (for example, from about 0.1 to about 5 weight percent of water, based upon total weight of the composition), or through the use of blowing agents which are vaporized by the exotherm of the reaction, or by a combination of the two methods. Illustrative polyurethane blowing agents include halogenated hydrocarbons such as trichloromonofluoromethane, dichlorodifluoromethane, dichloromonofluoromethane, dichloromethane, trichloromethane, 1,1-dichloro-1-fluoroethane, 1,1,2-trichloro-1,2,2-trifluoroethane, hexafluorocyclobutane, octafluorocyclobutane, and the like. Another class of blowing agents include thermally unstable compounds which liberate gases upon heating, such as N,N'-dimethyl-N,N'-dinitrosoterephthalamide, and the like. The quantity of blowing agent employed will vary with factors such as the density desired in the foamed product.

The organic polyisocyanates that are useful in producing the novel molded flexible polyurethane cellular products in accordance with this invention are organic compounds that contain at least two isocyanate groups and include the monomeric and polymeric organic polyisocyanates such as prepolymers produced by reacting a polyol with an excess of a polyisocyanate. The quasi-prepolymers such as the reaction products of excess tolylene diisocyanate and short chain polyoxypropylene diols or triols, are preferred in those instances where ease of processing such materials is desired. The polyisocyanates are well known in the art. Suitable organic polyisocyanates include the hydrocarbon diisocyanates (e.g., the alkylene diisocyanates and the arylene diisocyanates) as well as known triisocyanates. As examples of suitable polyisocyanates one can mention, 1,2-diisocyanatoethane, 1,3-diisocyanatopropane, 1,2-diisocyanatopropane, 1,4-diisocyanatobutane, 1,5-diisocyanatopentane, 1,6-diisocyanatohexane, bis(3-isocyanatopropyl) ether, bis(3-isocyanatopropyl) sulfide, 1,7-diisocyanatoheptane, 1,5-diisocyanato-2,2-dimethylpentane, 1,6-diisocyanato-3-methoxyhexane, 1,8-diisocyanatooctane, 1,5-diisocyanato-2,2,4-trimethylpentane, 1,9-diisocyanatononane, 1,10-diisocyanatopropyl ether of 1,4-butylene glycol, 1,11-diisocyanatoundecane, 1,12-diisocyanato-dodecane, bis(isocyanatohexyl) sulfide, 1,4-diisocyanato-benzene, 2,4-diisocyanatotoluene, 2,6-diisocyanato-toluene and mixtures thereof, 1,3-diisocyanato-o-xylene, 1,3-diisocyanato-m-xylene, 1,3-diisocyanato-p-xylene, 2,4-diisocyanato-1-chlorobenzene, 2,4-diisocyanato-1-nitrobenzene, and 2,5-diisocyanato-1-nitrobenzene, 4,4'-diphenylmethylene diisocyanate, 3,3'-diphenylmethylene diisocyanate, 2,4'-diphenylmethylene diisocyanate, modified diphenylmethylene diisocyanates modified with carbodiimides to liquefy same, and polymethylene poly(phenyleneisocyanates) having the formula:

wherein x has an average value from 1.1 to 5 inclusive (preferably from 2.0 to 3.0), and mixtures thereof. A preferred mixture of polyisocyanates comprises 80 wt. % 2,4-tolylenediisocyanate and 20 wt. % 2,6-tolylenediisocyanate.

LOW FORCE CRUSH FOAM

The following specific examples and procedures are presented to illustrate the invention, but are not to be construed as limitations thereon. The examples representing this invention are numbered; those examples that are lettered are comparative examples which do not illustrate the invention.

|         | Definitions                                               |
|---------|-----------------------------------------------------------|
| %       | Percent by weight unless otherwise specified              |
| ratios  | are based on weight                                       |
| parts   | parts by weight                                           |
| pbw     | parts by weight                                           |
| hrs     | hours                                                     |
| mins    | minutes                                                   |
| secs    | seconds                                                   |
| ppm     | parts per million by weight                               |
| lb      | pound                                                     |
| in      | inch                                                      |
| "       | inch                                                      |
| psi     | pounds per square inch                                    |
| ft      | foot                                                      |
| gms     | grams                                                     |
| FTC     | force to crush                                            |
| DEOA    | diethanolamine                                            |
| TDI     | toluene diisocyanate                                      |
| Polyol 1 | polypropylene oxide - polyethylene oxide polyol made from propylene and ethylene oxides and glycerine and having a theoretical number average molecular weight of about 5000 and a hydroxyl number of about 34–35. The alkylene oxide units are present |

-continued

Definitions

| | |
|---|---|
| | primarily in blocks and the end units are substantially all ethylene oxide units, i.e., the ethylene oxide is used to "cap" the polyol. Based on its total weight, this triol contains about 16.5 percent ethylene oxide. A polymer/polyol formed by copolymerizing a 48/52 weight ratio mixture of styrene to acrylonitrile in situ in polyol 1 to provide 22.5 weight % of styrene-acrylonitrle copolymer content based on the weight of polyol 2. The polymer/polyol has a nominal hydroxyl number of about 28. |
| Polyol 3 | A base polyol made from 96.5 wt. % polyol 4 as described below and 3.5 wt. % of a catalytic polyol. |
| Polyol 4 | A base polyol made from propylene and ethylene oxide and glycerine where potassium hydroxide is used to strip the glycerine before adding propylene oxide. The propylene oxide is also stripped before adding a 16.5 percent ethylene oxide cap. This base polyol has a theoretical number average molecular weight of about 6500 and a hydroxyl number of about 28. |
| Polyol 5 | A polymer/polyol based on polyol 4 formed by copolymerizing a 70/30 weight ratio mixture of styrene to acrylonitrile and having a theoretical number average molecular weight of about 8500 and a hydroxyl number of about 18-19. |
| Polyol 6 | A more combustion resistant polymer/polyol similar to polyol 5 having 92.5 parts of a 70/30 weight ratio mixture of styrene to acrylonitrile and 6.5 parts of vinylidene chloride. |
| Catalyst 1 | A 70 wt. % solution of bis(2-dimethylaminoethyl)ether and 30 wt. % dipropyleneglycol. |
| Catalyst 2 | A solution of 29 wt. % solid triethylenediamine, 61 wt. % dipropyleneglycol and 10 wt. % dimethylaminoethylmorpholine. |
| Catalyst 3 | A blocked form of catalyst 1 formed from one mole of catalyst 1 and one and one-half moles of formic acid to slow the catalysis. |
| Catalyst 4 | A 33 wt. % solution of triethylenediamine and 66 wt. % dipropyleneglycol (DPG). |
| Catalyst 5 | A solution of 87.7 wt. % of a blend of 67 wt. % dipropyleneglycol and 22 wt. % solid triethylenediamine and of 12.3 wt. % of 90 wt. % formic acid. |
| Catalyst 6 | Dibutyltin mercaptide |
| Blowing Agent | Trichloromonofluoromethane |
| Release Agent | Blend of polyethylene waxes which allows foam to be put in mold without sticking. |
| Surfactant 1 | An organo modified polysiloxane such as Union Carbide silicone surfactant Y-10,197. |
| Surfactant 2 | A silicone Polyether copolymer such as Union Carbide silicone surfactant Y-10,366. |
| Surfactant 3 | A silicone polyether copolymer such as Union Carbide Y-10,184. |
| Surfactant 4 | A silicone polyether copolymer modified to have a greater percentage of silicone such as Union Carbide silicone surfactant R-1127. |

GENERAL PROCEDURE

The following is illustrative of the type of molding conditions and formulations that were used in the subsequent examples.

| Formulation A | Parts by Weight |
|---|---|
| Polyol 1 | 60 |
| Polyol 2 | 40 |
| Diethanolamine | 1.53 |
| Water | 3.5 |
| Catalyst 1 | 0.15 |
| Catalyst 2 | 0.60 |
| Catalyst 6 | 0.0065 |
| Blowing Agent | 8.0 |
| Surfactant 1 | 1.8 |
| Toluene diisocyanate | 44.36 (104 index) |

The reactants in the above formulation were reacted at a starting temperatures of 72° Fahrenheit in a 15 inch×15 inch×5 inch aluminum mold using various releasing agents to prevent the reactants from sticking to the mold. Four 1/16 inch air bleed vents were used. A total of 7-14 grams of foam was extruded from the vents before the foam sealed the vents. The reactants were poured into a mold which was at 140° Fahrenheit at the time of pour and demolded 8 minutes later (i.e., not a rapid demold system). The temperature of the mold at demold was 155° Fahrenheit. Pressure release to the atmosphere varied according to the experiment and tests to determine force to crush reductions were conducted one minute after demold (9 minutes after pour).

All pressure releases were affected by mold lid unlatching. The force to crush was then determined one minute after demold utilizing an Instron tester equipped with a 1000 lb. compression load cell and a circular test foot of 28.27 in$^2$. A crosshead speed of 20" inches per minute was utilized to deflect the foam to a maximum of 75% of the original thickness. The maximum load required to reach this deflection level was recorded and subsequently divided by 28.27 to give force to crush readings in pounds per square inch (psi).

EXAMPLES 1 to 10

Table 1 shows the effect of varied pressure release times on the force required to crush this low density 8 minute demold foam system. Each of the pressure release times were at a point in time past the previously determined TPR window for this formulation (i.e., upper window limit of 110-115 seconds for an 8 minute demold formulation). It is readily apparent that very significant force to crush reductions are possible with proper pressure release time. For example, FTC reductions of 26% to 80% are observed over a foam pad demolded crush tested at the same time after pour but without benefit of the pressure release.

TABLE I

Force to Crush Effects
Formulation A

| Ex. | Pressure Release Time second | FTC* PSI | FTC Reduction, % |
|---|---|---|---|
| 1 | 120 | 2.19 | 80 |
| 2 | 130 | 3.54 | 68 |
| 3 | 140 | 4.60 | 58 |
| 4 | 150 | 4.95 | 55 |
| 5 | 160 | 5.31 | 52 |
| 6 | 180 | 6.12 | 44 |
| 7 | 210 | 6.33 | 42 |

TABLE I-continued

| Ex. | Force to Crush Effects Formulation A | | |
|---|---|---|---|
| | Pressure Release Time second | FTC* PSI | FTC Reduction, % |
| 8 | 240 | 7.68 | 30 |
| 9 | 270 | 7.75 | 29 |
| 10 | 300 | 8.14 | 26 |
| Comparative A | None | 10.97 | 0 |

*FTC: force to crush

EXAMPLES 11 to 15

In this example, the following formulation and molding conditions were used.

| Formulation B | Parts by Weight |
|---|---|
| Polyol 3 | 60 |
| Polyol 5 | 40 |
| Diethanolamine | 1.25 |
| Water | 4.5 |
| Catalyst 3 | 0.3 |
| Catalyst 4 | 0.23 |
| Catalyst 5 | 0.25 |
| Surfactant 2 | 1.50 |
| Toluene Diisocyanate | 50.65 (100 Index) |

The reactants in the above formulation were reacted at a starting temperatures of 71° Fahrenheit in a 15 inch×16 inch×5 inch aluminum mold using various releasing agents. Four 1/16 inch air bleed vents were used. A total of 12–18 grams of foam was extruded from the vents before the foam sealed these vents. The reactants were poured into a mold which was at 150° Fahrenheit at the time of pour and demold 3.5 minutes later (rapid demold). The temperature of the mold at demold was 155° Fahrenheit. Pressure release to the atmosphere varied according to experiment and tests to determine force to crush reductions were conducted 1 minute after demold (4.5 minutes after pour).

All pressure releases were effected by mold lid unlatching and force to crush was determined one minute after demold using the procedure described in the general procedures.

Table II below illustrates the effect of varied pressure releases on the FTC of this rapid demold system. Reductions in FTC of 11 to 53% were noted. In this case these FTC reductions are very significant due to the extreme tightness normally found in a non-pressure released foam made in a rapid demold system. Such foams are not only difficult to crush but often result in burst pads when crushing is attempted.

TABLE II

| Ex. | Force to Crush Effects Formulation B | | |
|---|---|---|---|
| | Pressure Release Time sec | FTC PSI | FTC Reduction, % |
| 1 | 85 | 6.93 | 53 |
| 2 | 95 | 9.20 | 38 |
| 3 | 105 | 10.61 | 28 |
| 4 | 125 | 12.38 | 16 |
| 5 | 145 | 13.09 | 11 |
| Comparative B | 210 (same as demold) | 14.75 | 0 |

EXAMPLE 16

The same parameters are example 11 were utilized to mold foam using an aluminum mold 15"×15"×4½". It was Found that a 105 second pressure release gave a foam that exhibited a FTC of 11.67 psi. A subsequent molding also utilizing a 105 second TPR, but immediately subjected to a momentary vacuum of 15" while the foam part remained in the mold, gave a FTC of 10.26 psi. It is apparent that further increasing the pressure differential on the cell windows by dropping the external pressure below atmospheric is advantageous.

EXAMPLE 17

Molded high resilience polyurethane foam automotive seat backs containing a large encapsulated steel frame were made on full scale equipment utilizing the following formulation.

| Formulation C | Parts by Weight |
|---|---|
| Polyol 4 | 60 |
| Polyol 5 | 40 |
| Diethanolamine | 1.25 |
| Water | 4.5 |
| Catalyst 3 | 0.3 |
| Catalyst 4 | 0.23 |
| Catalyst 5 | 0.25 |
| Catalyst 6 | 0.01 |
| Surfactant 3 | 1.50 |
| 2-ethylhexylphthalate | 4.0 |
| Toluene diisocyanate | (100 Index) |

The following molding equipment and molding conditions were utilized:

| Machine | 150 lb/min high pressure w/robotic pour head manipulation |
|---|---|
| Mold | Prototype automotive back w/integral temperature control and air bag clamping/aluminum construction |
| Stream temperatures | 70° F. |
| Stream Pressures (impingement mixing) | 1750 psi |
| Mold temperature at pour | 150° F. |
| Mold temperature at demold | 150° F. |
| Demold Time | 3.5 minutes |
| Crusher | Brush Rolls |
| Pressure Release Time | at demold & at 105 sec |
| Part Weight (foam) | 2318–2325 gms |

The parts molded per the foregoing were rated as "tight" and difficult to crush when the mold was maintained in a clamped or sealed state until immediately prior to demold. Three passes through a laboratory brush roll crusher were necessary to preclude part shrinkage. Pressure release accomplished by deflating of the clamping air bag at 105 seconds after start of pour resulted in a foam which was "open" and required only two passes through the crusher to preclude shrinkage.

EXAMPLES 18-20

Molded high resilience polyurethane foams were made in the laboratory utilizing the following formulation:

| Formulation D | Parts by Weight |
|---|---|
| Polyol 3 | 60 |
| Polyol 5 | 26.7 |
| Polyol 6 | 13.3 |
| DEOA | 1.25 |
| Water | 4.5 |
| Amine Catalyst 3 | 0.3 |

-continued

| Formulation D | Parts by Weight |
|---|---|
| Amine Catalyst 4 | 0.23 |
| Amine Catalyst 5 | 0.25 |
| Surfactant 4 | varied |
| Toluene diisocyanate | 50.65 (100 Index) |

The following molding conditions were maintained.

| | |
|---|---|
| Reactant temperatures | 70° F. |
| Release Agent | CT-1006 (Chemtrend) |
| Mold | 15" × 15" × 5" aluminum |
| Air bleed vents | 4 (1/16") |
| Vent extrusion weights | 17–22 grams |
| Mold temperature at pour | 150° F. |
| Demold Time | 3.5 minutes |
| Crush test time | 4.5 minutes |
| Pressure Release Time | None & 85 sec. |

Foams were made at a varied silicone surfactant levels of 1.5, 4.5 and 6.0 with the 4.5 and 6.0 levels being three to four times the level considered usable by state of the art high resilience technology. Excessive foam tightness normally places a formulation specific upper limit on the level a particular of silicone that can be utilized, although other processing parameters such as foam stability or freedom from collapse may gain from higher silicone levels. Compromises are normally made in silicone stabilization of a high resilience molding system to achieve workable, i.e., crushable, tightness at demold. Practice of this invention shows that such high levels of silicone stabilization have little or no effect on the FTC as compared to a non pressure released molding. Table III below summarizes the data obtained. The following observations are apparent: The 1.5 silicone level without pressure release is obviously borderline tight, for in this case the pad burst while being crush tested. At 6.0 parts of silicone with an 85 second pressure release, the observed FTC is essentially the same as that at 1.5 parts silicone.

TABLE III

| | | Force to Crush Formulation D Silicone Effects | |
|---|---|---|---|
| Ex | Silicone Level | Pressure Release Time sec | FTC, psi |
| C | 1.5 | at Demold | 15.42* |
| D | 4.5 | at Demold | ** |
| 18 | 1.5 | 85 | 9.98 |
| 19 | 4.5 | 85 | 11.50 |
| 20 | 6.0 | 85 | 10.08 |

*This foam burst during the crush test due to excessive tightness.
**This foam burst before an FTC test was even possible to conduct.

Using 4.5 parts of silicone a pad was made and not pressure released. This pad was put through a laboratory roll crusher and promptly burst into three pieces. A companion pad made with an 85 second pressure release was easily crushed and did not burst or shrink confirming the formulation latitude advantage to be realized by practice of this invention.

I claim:

1. A process for making molded high resilience polyurethane cellular products which require reduced crushing in preventing said products from substantially shrinking or changing dimensionally upon cooling comprising:
   (a) introducing a liquid foamable polyurethane reaction mixture into a mold adopted to expose the mixture to atmospheric pressure during the curing of said product and said mold adapted to be closed;
   (b) closing said mold;
   (c) permitting said reaction mixture to expand into contact with the confines of the mold to form a curing molded polyurethane cellular product containing cells having cell walls of curing polyurethane and pressurized expansion gases contained within and supporting said cell walls;
   (d) exposing said curing product to atmospheric pressure while in contact with the confines of the mold at a time when said cell walls of said curing polyurethane cellular product have cured sufficiently to develop sufficient strength to partially resist bursting by the pressure of said expansion gases contained within said cell walls upon exposure to atmospheric pressure, but before said cell walls have cured sufficiently to develop sufficient strength so that exposure to atmospheric pressure does not result in a reduction of the crushing force necessary to prevent said products from substantially shrinking or changing dimensionally;
   (e) allowing said curing polyurethane product to continue to cool and cure in said mold until it has developed sufficient strength to be removed from the mold without permanently distorting its shape;
   (f) removing said product from said mold; and
   (g) crushing said product to prevent shrinkage or dimensional change.

2. A process for making molded high resilience polyurethane cellular products which require reduced crushing in preventing said product from substantially shrinking or changing dimensionally upon cooling comprising:
   (a) introducing a liquid foamable polyurethane reaction mixture into a mold adopted to expose the mixture to atmospheric pressure during the curing of said product and said mold adapted to be closed;
   (b) closing said mold;
   (c) permitting said reaction mixture to expand into contact with the confines of the mold to form a curing molded polyurethane cellular product containing cells having cell walls of curing polyurethane and pressurized expansion gases contained within and supporting said cell walls;
   (d) exposing said curing product to atmospheric pressure while in contact with the confines of the mold at a time when said cell walls of said curing polyurethane cellular product have cured sufficiently to develop sufficient strength to partially resist bursting by the pressure of said expansion gases contained within said walls upon exposure to atmospheric pressure, but before said cell walls have cured sufficiently to develop sufficient strength so that exposure to atmospheric pressure does not result in a reduction of crushing force of at least 25% in a regular demold system in the crushing step necessary to prevent said products from substantially shrinking or changing dimentionally;
   (e) allowing said curing polyurethane product to continue to cool and cure in said mold until it has developed sufficient strength to be removed from the mold without permanently distorting its shape;
   (f) removing said product from said mold; and
   (g) crushing said product to prevent shrinkage or dimensional change.

3. The process according to claim 1 wherein the molded high resilience polyurethane cellular products are made from highly reactive polyurethane reaction mixtures characteristic of rapid demold systems.

4. The process according to claim 1 wherein the force to crush the molded high resilience polyurethane cellular products is reduced from 10% to 90%.

5. The process according to claim 2 wherein the force to crush the molded high resilience polyurethane cellular products is reduced from 25% to 90%.

6. The process according to claim 1 wherein a vacuum is used to increase the pressure differential between internal cell gases and the pressure outside the mold.

7. The process according to claim 2 wherein a vacuum is used to increase the pressure differential between internal cell gases and the pressure outside the mold.

8. The process according to claim 1 wherein a silicone surfactant is employed in an amount up to 6.0 parts by weight of the total system.

9. The process according to claim 2 wherein a silicone surfactant is employed in an amount up to parts by weight of the total system.

* * * * *